United States Patent
Kishore et al.

(10) Patent No.: US 8,805,307 B2
(45) Date of Patent: Aug. 12, 2014

(54) BROADBAND RE-CONFIGURABLE RF TRANSMITTER

(71) Applicants: Ravi Kishore, Chennai (IN); Kumaralingam Ramamoorthy, Chennai (IN); Ajeet Pal, Chennai (IN); Kameswara Rao Balijapalli, Chennai (IN)

(72) Inventors: Ravi Kishore, Chennai (IN); Kumaralingam Ramamoorthy, Chennai (IN); Ajeet Pal, Chennai (IN); Kameswara Rao Balijapalli, Chennai (IN)

(73) Assignee: HCL Technologies Limited, Chonnai, Tamil Nadu (IN)

(*) Notice: Subject to any disclaimer, the term of this patent is extended or adjusted under 35 U.S.C. 154(b) by 0 days.

(21) Appl. No.: 13/723,228

(22) Filed: Dec. 21, 2012

(65) Prior Publication Data

US 2014/0179246 A1    Jun. 26, 2014

(51) Int. Cl.
*H04B 17/00*    (2006.01)

(52) U.S. Cl.
USPC ............... 455/115.1; 455/118; 455/127.1

(58) Field of Classification Search
USPC ............ 455/73, 91, 92, 102, 103, 115.1, 118, 455/127.1, 127.2, 127.3; 375/299, 300
See application file for complete search history.

(56) References Cited

U.S. PATENT DOCUMENTS

| | | | |
|---|---|---|---|
| 7,424,064 B2 * | 9/2008 | Shakeshaft et al. | 455/102 |
| 8,036,308 B2 * | 10/2011 | Rofougaran | 375/300 |
| 8,064,855 B2 * | 11/2011 | McCune et al. | 455/127.1 |

* cited by examiner

Primary Examiner — Thanh Le

(57) ABSTRACT

An RF transmitter system operating on a broader frequency range and providing a higher output power dynamic range is described. Low power RF signal is produced from a baseband signal using a quadrature modulator and using a broadband local oscillator signal. A microcontroller system controls the RF transmitter by selecting frequency range to be produced by the frequency synthesizer, selecting appropriate amplification path for producing the required output power, controlling the power detection sections for providing precise automatic power and automatic gain control.

46 Claims, 8 Drawing Sheets

BROADBAND RE-CONFIGURABLE RF TRANSMITTER

The present application is based on, and claims priority from, IN Application Number 2433/CHE/2012, filed on 19 Jun. 2012, the disclosure of which is hereby incorporated by reference herein.

TECHNICAL FIELD

This embodiment relates to radio frequency transmitter and more particularly to a RF transmitter with re-configurable frequency and re-configurable output power.

BACKGROUND

Advances in wireless technology along with development of analog/digital electronics has lead to wide range of wireless/radio access technologies. Each radio access technology has a specific purpose, works on a particular frequency/frequency band and requires different output power dynamic range. Transmitters of user equipment devices are generally made specific for each wireless technology. It is essential that user equipments support all radio access technologies based on need and availability. In some user equipments, multiple transmitters are used for accessing multiple radio access technologies like GSM, CDMA, WCDMA, Wi-Fi, Bluetooth and so on. This leads to heavier and more complex user equipment along with various interference issues.

Wireless communication systems like cognitive radio are working towards allowing the wide frequency spectrum to be shared thus enabling efficient radio spectrum utilization where in base station/access point and user equipments needs to be broadband and re-configurable in terms of frequency range of operation and output power.

For cognitive radios to succeed, it is essential that the transmitters are capable of operating in a broader frequency range and provide adequate output dynamic power range.

SUMMARY

Accordingly the embodiment provides a re-configurable broadband radio frequency transmitter system operating on a broad frequency range and providing a wide output power dynamic range comprising a quadrature modulator for generating low power RF signal from a baseband signal; a broadband local oscillator with multiple frequency selection paths for generating and re-configuring the operating frequency; an amplification path selection and digital variable attenuator-DVA setting for re-configuring to desired output power; multiple radio frequency power detection sections for precise detection and generation of desired output power level; a radio frequency power detection section for automatic power control and automatic gain control; a reference frequency section for providing the reference frequency to frequency synthesizer; and a microcontroller for receiving sending signals for re-configuring the radio frequency transmitter.

Also, disclosed herein is a method for operating on a broad frequency range and providing a wide output power range in an radio frequency transmitter, the method comprising of generating low power radio frequency signal from a baseband signal using a quadrature modulator; generating and re-configuring operating frequency using a broadband local oscillator with multiple frequency paths; selecting amplification path and digital variable attenuator-DVA setting for re-configuring RF transmitter to desired output power; detecting power and generating desired output power level using multiple RF power detection module; providing reference frequency to a frequency synthesizer using a reference frequency section; and receiving and sending signals for re-configuring and controlling the radio frequency transmitter from a microcontroller.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
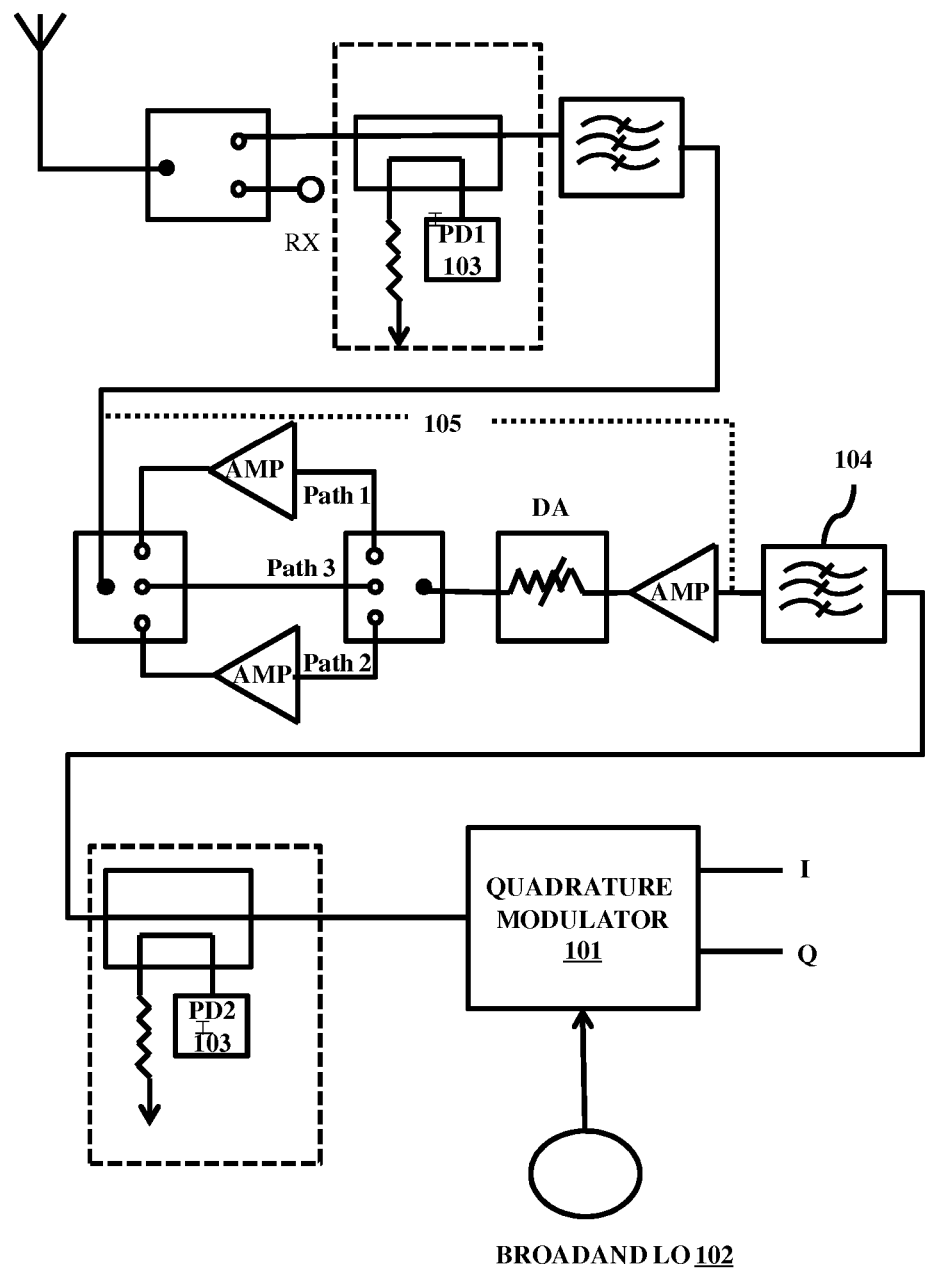
FIG. 1 illustrates a low level block diagram of broadband re-configurable RF transmitter, according to the embodiments as disclosed herein; also it illustrates the incorporation/usage of multiple Power detection sections for precise output power generation

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 7, where similar reference characters denote corresponding features consistently throughout the figures, there are shown preferred embodiments.

FIG. 1 illustrates a low-level block diagram of broadband re-configurable RF transmitter, according to the embodiments as disclosed herein. The broadband, reconfigurable RF transmitter comprises of quadrature modulator, broadband local oscillator circuitry, RF amplifiers, RF variable attenuators, RF Power detection circuitry, reference generation circuitry and control and monitoring circuitry. The baseband signal with I and Q channels is fed to the wideband quadrature modulator 101. The local oscillator signal for the quadrature modulator 101 is generated using broadband Local oscillator circuitry 102. The low power RF signal generated by quadrature modulator 101 is subjected to required amplification 105 and attenuation 104 to provide the required output power. The re-configurability in terms of operating frequency is provided by changing the Local oscillator signal (from the broadband local oscillator circuitry 102) to the quadrature modulator 101. The re-configurability in terms of output power is provided by selecting the appropriate amplification path (out of the three (N) paths) and appropriate DVA settings in the corresponding path. The frequency is re-configurable or changeable in precise steps (say in the order of 100 KHz). The output power is re-configurable and changeable in precise steps (say in the order of 1 dB). Multiple power detection sections are used for precise power detection and thus for precise automatic power control (APC) and Automatic Gain Control (AGC) with precise output power level. Plurality of power detection circuitry is placed into the chain. Multiple power detection circuits output signal sends to the controller, where it is matches with desired output signal power level, by which can get accurate and precise output power. The power detection circuitry comprising an ultra high bandwidth, high directivity coupler and power detector. The reference signal required for generating the Local oscillator signal is provided using reference generating circuitry. The controlling and re-configuring are done by the control and monitoring circuitry. In the presence of receiver, transmitter can also work at the (Time Division Duplex) mode using a switch and can work in FDD (Frequency Division Duplex) mode also.

Figure 2:
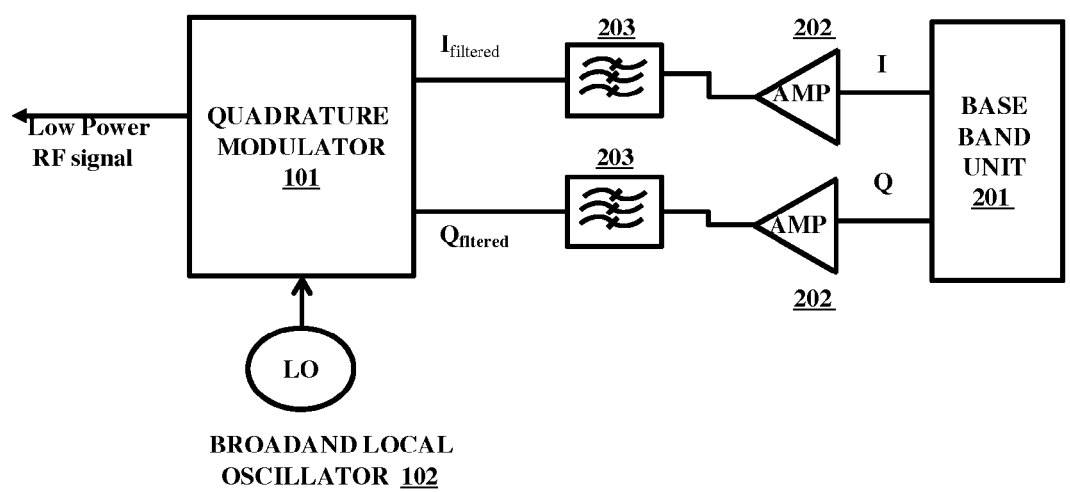
FIG. 2 is an block diagram describing In-Outs of quadrature modulator, according to the embodiments disclosed herein.

FIG. 2 is a block diagram describing In-Outs of quadrature modulator, according to the embodiments disclosed herein. The implementation is based on direct conversion architecture but dual conversion/super heterodyne architecture can also be employed. The wide bandwidth baseband signal (say ranging from Zero to 22 MHz) from baseband unit 201 is amplified and filtered by the baseband amplifier 202 and filter section 203 and fed to the wideband quadrature modulator 101. The local oscillator signal required for the quadrature modulator 101 is provided by the broadband LO circuitry 102. The quadrature modulator 101 gives low power RF output signal between the operating frequency ranges (say from 400 MHz to 6000 MHz).

Figure 3:
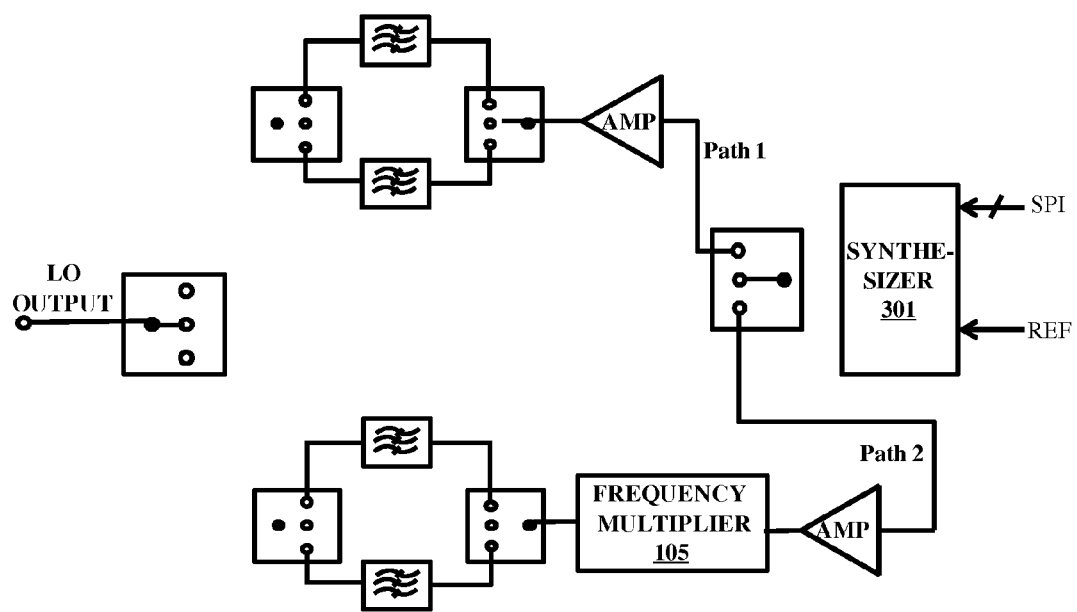
FIG. 3 is a block diagram of broadband local oscillator section, according to embodiments disclosed herein.

FIG. 3 is a block diagram of broadband local oscillator section, according to embodiments disclosed herein. A frequency synthesizer 301 is used to produce the desired range of frequencies. Reference frequency generated by the reference generating section is for the frequency synthesizer 301. Synthesizer 301 receives commands from the control and monitoring circuitry and accordingly generates a broadband local oscillator frequency. To achieve the broadband operation, the LO section comprises two frequency selection paths. The path 1 is to generate the portion of the entire frequency range that the frequency synthesizer could support. The path 2 comprises a frequency multiplier to cover the remaining portion of the frequency range and that the frequency synthesizer could not support. Appropriate amplification and filtering is provided in both paths to achieve required LO power level and with adequate harmonic rejection. Appropriate path will be selected using RF switches, which receives the commands from control and monitoring circuitry. The broadband RF transmitter is able to operate on broader range of frequency and able to re-configure to any frequency within the operating frequency range. The low power RF signal from the quadrature modulator 101 is passed through the amplifiers, variable digital attenuators and filters to feed the antenna unit with required output power.

Figure 4:
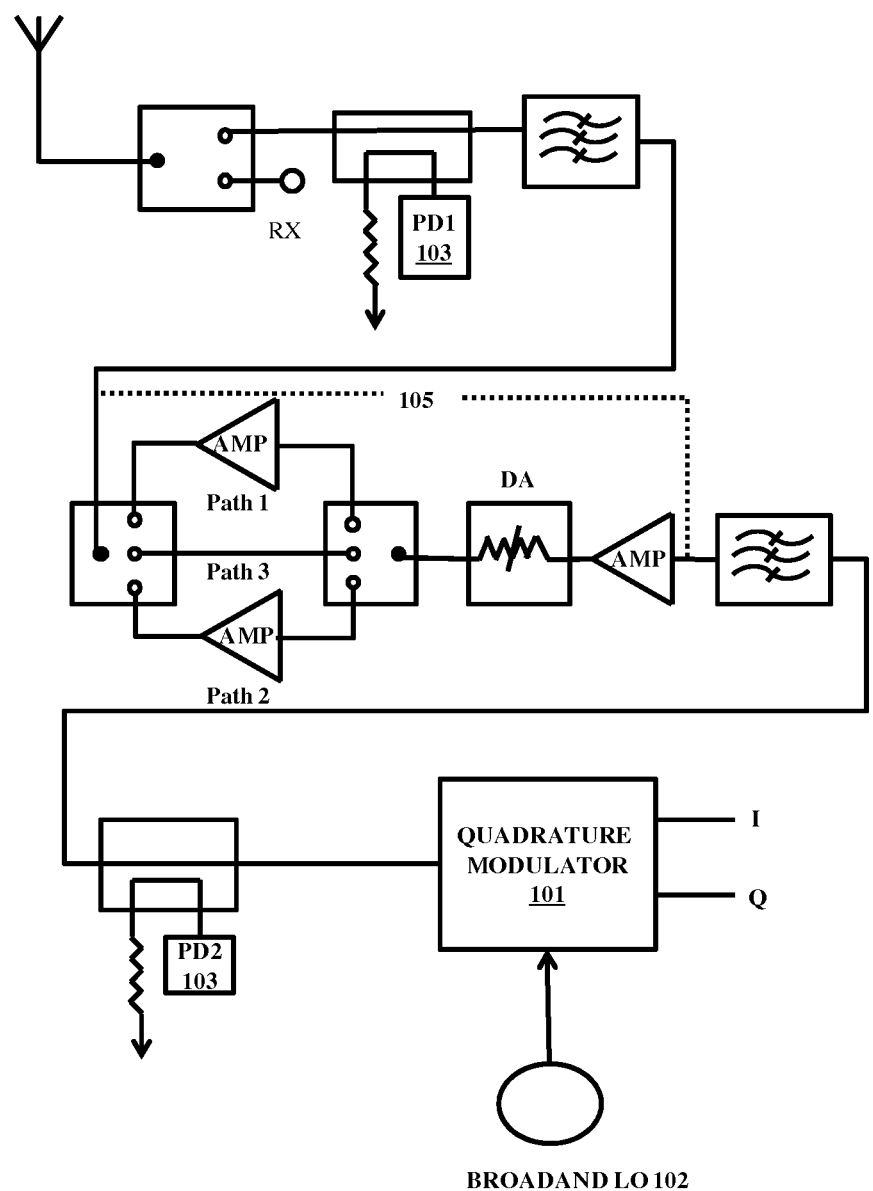
FIG. 4 is a block diagram showing path switching to achieve broad output power dynamic range in the re-configurable RF transmitter, according to embodiments disclosed herein.

FIG. 4 is a block diagram showing path switching to achieve broad output power dynamic range in the re-configurable RF transmitter, according to embodiments disclosed herein. In order to provide the broad output power dynamic range over broad frequency range, appropriate amplification path is selected. For a portion (Portion A_Freq) of the frequency range and for portion of the dynamic range (Portion A_Outputpower), path 1 will be selected. For the remaining portion of the frequency range (Portion B_Freq) and for the remaining portion of the output power dynamic range (Portion B_Outputpower), path 2 will be selected. To further enhance the output power dynamic range (on the lower side for low power levels), for both the portion A and portion B of the Frequency range, path 3 is selected. The average output power can be set (say in the range, −70 dBm to +10 dBm in 1 dB steps) through the switches and digital variable attenuators (DVAs) by microcontroller. The instruction for amplification path selection is given by a microcontroller based on requirement. The broadband RF transmitter is able to operate on broader range of output power and able to re-configure to any output power level within the operating dynamic range.

Figure 5:
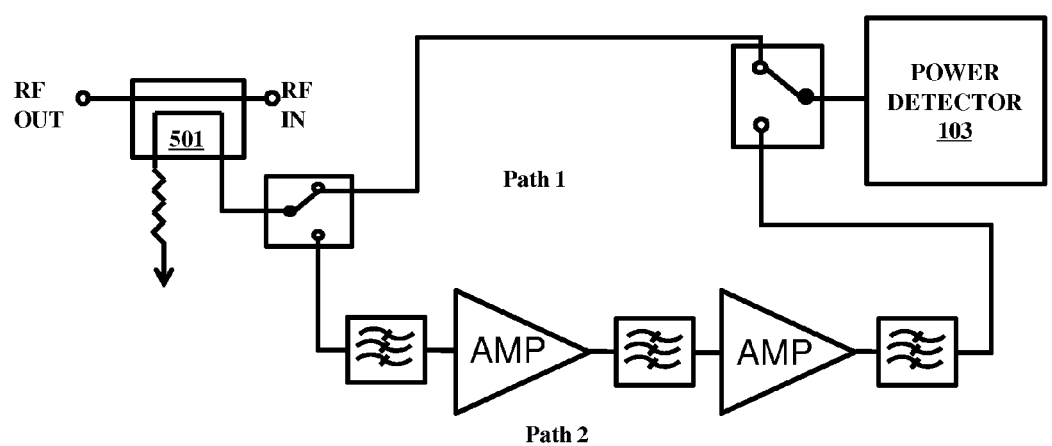
FIG. 5 is a block diagram of the power detection section used in the re-configurable RF transmitter, according to embodiments disclosed herein.

FIG. 5 is a block diagram of the power detection section used in the re-configurable RF transmitter, according to embodiments disclosed herein. As part of the power detection circuitry, over a broad range of frequencies, a broadband directional coupler 501 is used. The detailed description of the broadband directional coupler is provided in 2241/CHE/2012, the description of which is included herein by reference. In order to provide the power detection for a broad power range, suitable amplification and bypass path is provided to the coupled signal. For a portion of the detecting signal, path 1 will be selected and for the remaining portion of the detecting signal, path 2 is selected. The coupled signal is provided to the RF power detector to report the signal level to the controller for automatic gain control (AGC) or automatic power control (APC) functionality.

Figure 6:
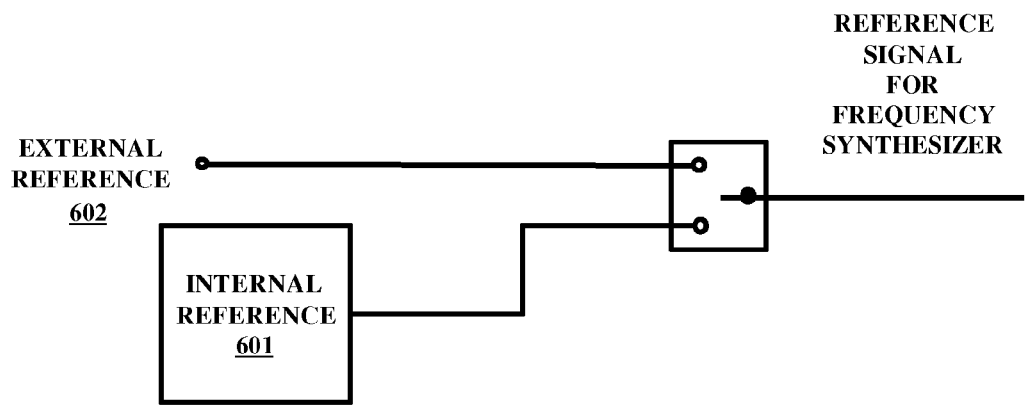
FIG. 6 is a block diagram of reference generating section used in the re-configurable RF transmitter, according to embodiments disclosed herein.

FIG. 6 is a block diagram of reference generating section used in the re-configurable RF transmitter, according to embodiments disclosed herein. The reference section produces the required reference signal 602 for the frequency synthesizer to produce the LO signal. By default, system operates with internal reference 601 frequency which is generated by the TCXO/OCXO (say 10 MHz). In the presence of the external reference frequency 602 (say at 10 MHz) with required frequency and adequate power level, internal reference will be automatically switched off and external reference is given to the Frequency synthesizer 301. A RF switch is used to select the external reference frequency.

Figure 7:
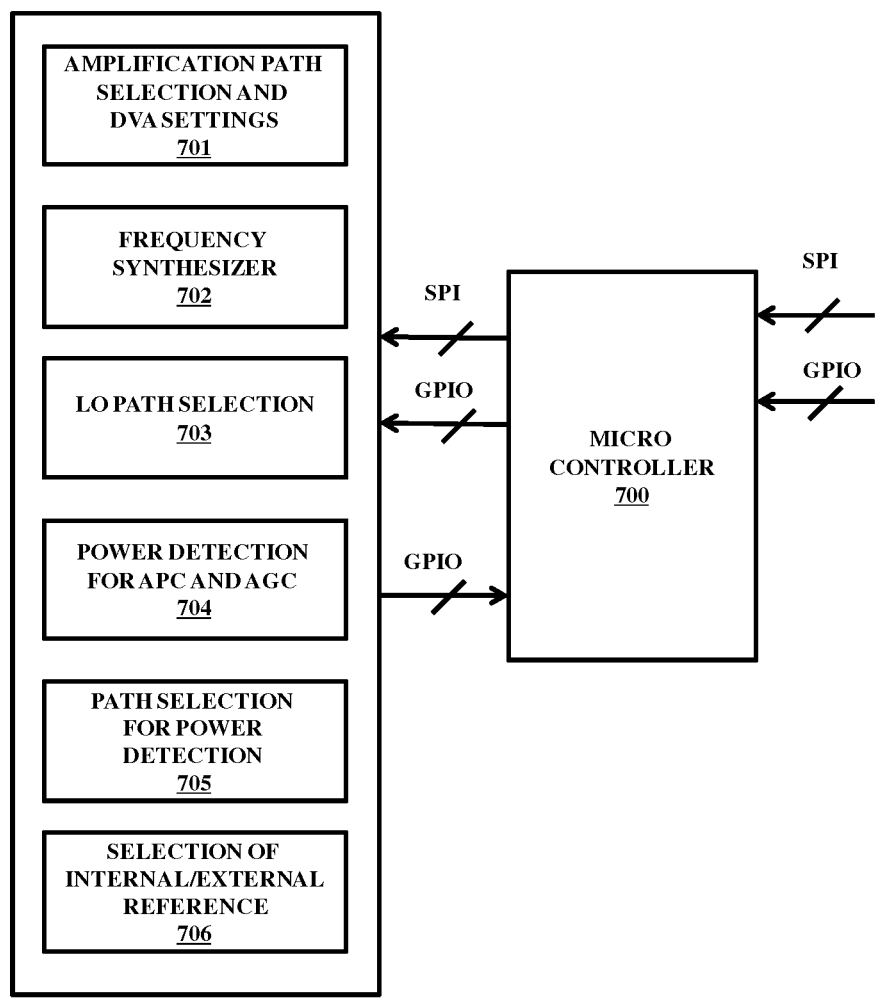
FIG. 7 is a block diagram of control and monitoring section used in the re-configurable RF transmitter, according to embodiments disclosed herein.

FIG. 7 is a block diagram of control and monitoring section used in the re-configurable RF transmitter, according to embodiments disclosed herein. The control and monitoring section reports the health status of the RF transmitter to the base band unit. The control and monitoring interface section contains a microcontroller 700 and its associated circuitry. It main functions include control of amplification path selection and digital variable attenuator (DVA) setting 701, frequency synthesizer 702, local oscillator path selection 703, power detection 704 for automatic gain control and automatic power control, path selection 705 for power control and selection of internal/external references 706. This microcontroller 700 receives instruction from the baseband unit (BBU) through an interface (say SPI) for a required frequency (within the frequency range of operation) and required output power (within the output power dynamic range). The microcontroller 700 configures the Frequency synthesizer 702 of the LO circuitry for the corresponding frequency and will select the appropriate attenuation and amplification path for the corresponding output power. The controller will also select the appropriate path (Direct/frequency multiplier path) for the broadband local oscillator. Using the software implementation in microcontroller and with the help of the power detection circuitry, AGC and APC functionalities are executed. The transmitter is re-configurable in terms of frequency change and output power change as per the commands it receive from the baseband unit and power detection section.

Figure 8:
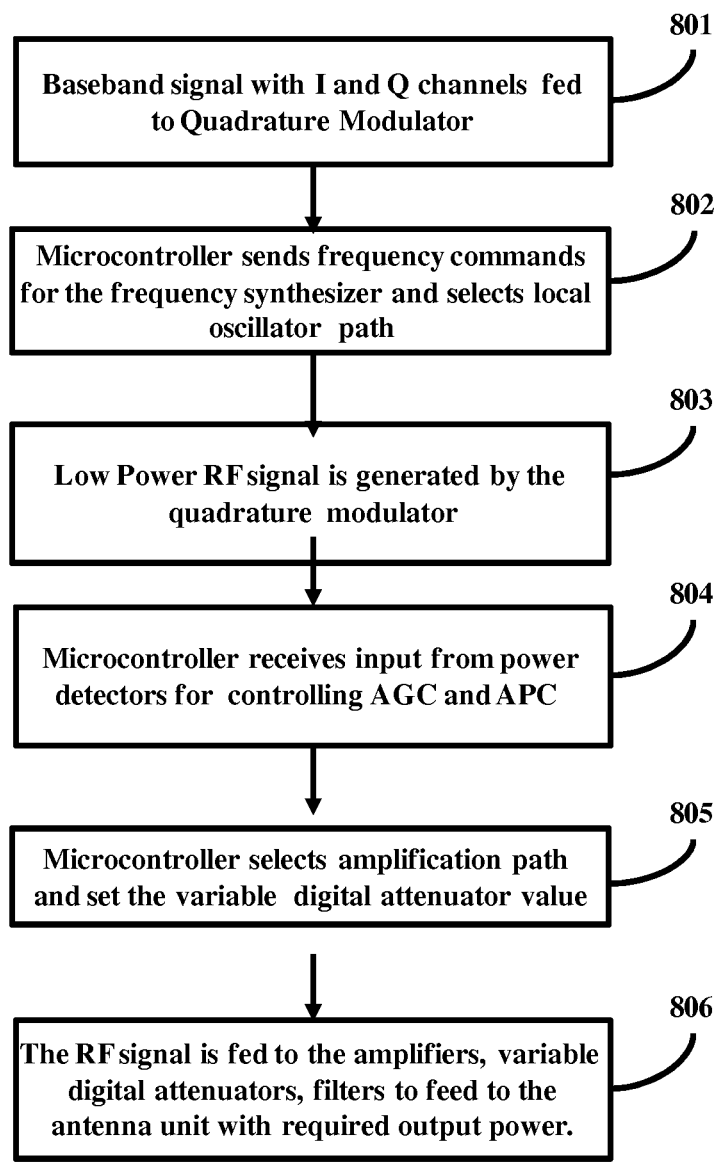
FIG. 8 is a flowchart describing the method of operation of the broadband re-configurable RF transmitter, according to the embodiments as disclosed herein.

FIG. 8 is a flowchart describing the method of operation of the broadband re-configurable RF transmitter, according to the embodiments as disclosed herein. The method begins by feeding 801 the broadband signal with I and Q channels to quadrature Modulator 101. The microcontroller 700 sends 802 the command corresponding to set the required operating frequency to the frequency synthesizer 301 and selects appropriate path of the broadband local oscillator. The quadrature modulator 101 then generates 803 a low power RF signal. The microcontroller 700 receives 804 inputs from power detectors 103 for automatic gain control and automatic power control. The microcontroller 700 selects 805 the appropriate amplification path and DVA setting based on output power level required. The RF signal is then fed 806 to amplifiers, variable digital attenuators, filters to feed antenna unit with required output power. Some of steps performed in method descried in FIG. 8 may be performed simultaneously, or in a different order.

The broadband reconfigurable RF transmitter is well suited in broadband wireless communication systems that requires a broad frequency range of operation (say 400 MHz to 6000 MHz) and requires broad output power dynamic range (say −70 dBm to +10 dBm average output power). Also, the broadband re-configurable RF transmitter is well suited in multi band wireless communication systems that operate on multiple bands/multiple standards (GSM, CDMA, UMTS, Wi-Fi, GPS, etc). Considering the broadband and re-configurability, the broadband RF transmitter is well suited for flexible RF front end for Software Defined radios (SDRs) and Cognitive Radios (CRs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A re-configurable broadband radio frequency transmitter system operating on a broad frequency range and providing a wide output power dynamic range comprising:

a quadrature modulator for generating low power RF signal from a baseband signal;

a broadband local oscillator with multiple frequency selection paths for generating and re-configuring said operating frequency;

an amplification path selection and digital variable attenuator-DVA setting for reconfiguring to desired output power;

multiple radio frequency power detection sections for precise detection and generation of desired output power level;

a radio frequency power detection section for automatic power control and automatic gain control;

a reference frequency section for providing the reference frequency to frequency synthesizer; and a microcontroller for receiving sending signals for re-configuring the radio frequency transmitter.

2. The broadband re-configurable radio frequency transmitter system according to claim 1, wherein the baseband signal amplification section comprises of:

a plurality of baseband amplifiers, responsive to provide an appropriate amplification to a baseband signal; and a plurality of baseband filter, responsive to filter the amplified baseband signal.

3. The broadband re-configurable radio frequency transmitter system according to claim 1, wherein said quadrature modulator converts a baseband signal from a base band unit into a low power radio frequency signal using signal from said broadband local oscillator.

4. The broadband re-configurable broadband radio frequency transmitter system according to claim 1, wherein said multiple frequency selection paths of broadband local oscillator comprises of:

one path to generate the portion of the entire frequency range that the frequency synthesizer could support; and one path comprises a frequency multiplier to cover the remaining portion of the frequency range and that the frequency synthesizer could not support.

5. The broadband re-configurable broadband radio frequency transmitter system according to claim 1 comprises of:

a plurality of the radio frequency amplifiers, responsive to provide the amplification to the generated local oscillator frequency from the frequency synthesizer;

a plurality of radio frequency switches, responsive to provide an amplification path according to local oscillator frequency; and a plurality of low pass filter, for harmonics rejection.

6. The broadband re-configurable radio frequency transmitter system according to claim 1, wherein said broadband local oscillator changes frequency in precise steps.

7. The broadband re-configurable radio frequency transmitter system according to claim 1, wherein said broadband local oscillator changes frequency in order of 100 KHz.

8. The broadband re-configurable radio frequency transmitter system according to claim 1, wherein said frequency synthesizer re-configures at any frequency within the frequency range of the synthesizer using said the microcontroller.

9. The broadband re-configurable broadband radio frequency transmitter system according to claim 1, wherein said frequency selection path is selected based on the operating frequency selected by said microcontroller.

10. The broadband re-configurable broadband radio frequency transmitter system according to claim 1, wherein said desired output dynamic power is re-configurable and changeable in precise steps.

11. The broadband re-configurable broadband radio frequency transmitter system according to claim 1, wherein said desired output power is changed in the order of 1 dB.

12. The broadband re-configurable broadband radio frequency transmitter system according to claim 1, wherein said desired output power is selected by selection of an amplification path using a radio frequency switch and corresponding digital variable attenuator-DVA setting in the corresponding path by said microcontroller.

13. The broadband re-configurable broadband radio frequency transmitter system according to claim 1, wherein said desired output power is achieved precisely by using multiple power detection sections.

14. The broadband re-configurable broadband radio frequency transmitter system according to claim 1, wherein said multiple power detection sections provide the automatic power control (APC) or automatic gain control (AGC) with precise output power level.

15. The broadband re-configurable broadband radio frequency transmitter system according to claim 1, wherein said power detection section comprises of ultra high bandwidth, high directivity coupler and power detector.

16. The broadband re-configurable broadband radio frequency transmitter system according to claim 1, wherein said power detection section selects suitable amplification path using the radio frequency switch and corresponding filtering components using said microcontroller.

17. The broadband re-configurable radio frequency transmitter system according to claim 1, wherein said reference frequency section provides reference signal to the frequency synthesizer.

18. The broadband re-configurable radio frequency transmitter system according to claim 17, wherein under the presence of external reference frequency with adequate power level and required frequency, the internal frequency will automatically get powered-off.

19. The broadband re-configurable radio frequency transmitter system according to claim 1, wherein said reference section comprises of an internal frequency generator and an external frequency reference.

20. The broadband re-configurable radio frequency transmitter system according to claim 19, wherein under the presence of external reference frequency with adequate power level and required frequency, the internal frequency will automatically get powered-off.

21. The broadband re-configurable radio frequency transmitter system according to claim 1, wherein said microcontroller receives command signals from the baseband unit, and sends the control signals for the proper functioning of the transmitter.

22. The broadband re-configurable radio frequency transmitter system according to claim 1, wherein said microcontroller sends the health status of the transmitter to the baseband unit.

23. The broadband re-configurable radio frequency transmitter system according to claim 1, wherein the transmitter can operate in both Time Division Duplex and Frequency Division Duplex mode using a radio frequency switch in presence of a transmitter.

24. A method for operating on a broad frequency range and providing a wide output power range in an radio frequency transmitter, said method comprising of:
generating low power radio frequency signal from a baseband signal using a quadrature modulator;
generating and re-configuring operating frequency using a broadband local oscillator with multiple frequency paths;
selecting amplification path and digital variable attenuator-DVA setting for reconfiguring RF transmitter to desired output power;
detecting power and generating desired output power level using multiple RF power detection module;
providing reference frequency to a frequency synthesizer using a reference frequency section; and
receiving and sending signals for re-configuring and controlling the radio frequency transmitter from a microcontroller.

25. The method as in claim 24, wherein the baseband signal amplification section comprises of:
a plurality of baseband amplifiers, responsive to provide an appropriate amplification to a baseband signal; and
a plurality of baseband filter, responsive to filter the amplified baseband signal.

26. The method as in claim 24, wherein said quadrature modulator converts a baseband signal from a base band unit into a low power radio frequency signal using signal from said broadband local oscillator.

27. The method as in claim 24, wherein said multiple frequency selection paths of broadband local oscillator comprises of:
one path to generate the portion of the entire frequency range that the frequency synthesizer could support; and
one path comprising of a frequency multiplier covers the remaining portion of the frequency range not supported by the frequency synthesizer.

28. The method as in claim 24, further comprises of:
a plurality of the radio frequency amplifiers, responsive to provide the amplification to the generated local oscillator frequency from the frequency synthesizer;
a plurality of radio frequency switches, responsive to provide an amplification path according to local oscillator frequency; and
a plurality of low pass filter, for harmonics rejection.

29. The method as in claim 24, wherein said broadband local oscillator changes frequency in precise steps.

30. The method as in claim 24, wherein said broadband local oscillator changes frequency in order of 100 Khz.

31. The method as in claim 24, wherein said frequency synthesizer re-configures at any frequency within the frequency range of the synthesizer using said the microcontroller.

32. The method as in claim 24, wherein said frequency selection path is selected based on the operating frequency selected by said microcontroller.

33. The method as in claim 24, wherein said desired output dynamic power is reconfigurable and changeable in precise steps.

34. The method as in claim 24, wherein said desired output power is changed in the order of 1 dB.

35. The method as in claim 24, wherein said desired output power is selected by selection of an amplification path using a radio frequency switch and corresponding digital variable attenuator-DVA setting in the corresponding path by said microcontroller.

36. The method as in claim 24, wherein said desired output power is achieved by multiple power detection sections.

37. The method as in claim 24, wherein said multiple power detection sections provide the automatic power control (APC) or automatic gain control (AGC) with precise output power level.

38. The method as in claim 24, wherein said power detection section selects suitable amplification path using the radio frequency switch and corresponding filtering components using said microcontroller.

39. The method as in claim 24, wherein said reference frequency section which provides reference signal to the frequency synthesizer.

40. The method as in claim 39, wherein under the presence of external reference frequency with adequate power level and required frequency, the internal frequency will automatically get powered-off.

41. The method as in claim 24, wherein said reference section comprises of an internal frequency generator and an external frequency reference.

42. The method as in claim 41, wherein under the presence of external reference frequency with adequate power level and required frequency, the internal frequency will automatically get powered-off.

43. The method as in claim 24, wherein said microcontroller receives command signals from the baseband unit, and sends the control signals for the proper functioning of the transmitter.

44. The method as in claim 24, wherein said microcontroller sends the health status of the transmitter to the baseband unit.

45. The method as in claim 24, wherein said power detection section comprises of ultra high bandwidth, high directivity coupler and power detector.

46. The method as in claim 24, wherein the transmitter can operate in both Time division duplex and Frequency division duplex mode using a radio frequency switch in presence of a transmitter.

* * * * *